(12) United States Patent
Kageyama

(10) Patent No.: US 6,476,940 B1
(45) Date of Patent: Nov. 5, 2002

(54) FACSIMILE APPARATUS FOR RECORDING IMAGE INFORMATION ON A RECORD SHEET OF PREDETERMINED SIZE

(75) Inventor: Mitsuhiro Kageyama, Urawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/666,016

(22) Filed: Sep. 19, 2000

Related U.S. Application Data

(62) Division of application No. 08/990,779, filed on Dec. 15, 1997, which is a continuation of application No. 08/388,847, filed on Feb. 15, 1995, now abandoned.

(30) Foreign Application Priority Data

Feb. 16, 1994 (JP) .............................................. 6-041990

(51) Int. Cl.⁷ .............................. H04N 1/40; H04N 1/32
(52) U.S. Cl. ...................................... 358/468; 358/449
(58) Field of Search ................................ 358/403, 440, 358/468; 382/317; 399/84; 379/100.07

(56) References Cited

U.S. PATENT DOCUMENTS

| | | | |
|---|---|---|---|
| 4,924,324 A | 5/1990 | Takaoka | ..................... 358/449 |
| 5,053,885 A | 10/1991 | Telle | ........................... 358/449 |
| 5,148,295 A | 9/1992 | Matsubara | ................... 358/449 |
| 5,343,306 A | 8/1994 | Oshita | ......................... 358/449 |
| 5,428,459 A | 6/1995 | Asai | ............................ 358/449 |
| 5,521,720 A | 5/1996 | Yoshida | ....................... 358/449 |

*Primary Examiner*—Kimberly A. Williams
(74) *Attorney, Agent, or Firm*—Fitzpatrick, Cella, Harper & Scinto

(57) ABSTRACT

A recording apparatus that compares the size of detected input data with a plurality of sizes of recording sheets set by a setting unit. The size of a recording sheet on which the input data is to be recorded is selected from the set plurality of sizes and the input data is recorded on the selected recording sheet. When no recording sheet of a size equal to or greater than the size of the input data is set, the size of the input data is compared with the sizes M times (M: an integer) as much as the plurality of sizes of recording sheets, respectively, and (1) if any of the M times sizes is equal to or greater than the size of the input data, it is selected as the size of recording sheet on which the input data is to be recorded. A recording unit divisionally records the input data on M pieces of recording sheets having the selected size; and (2) if none of the M times sizes is equal to or greater than the size of the input data, the apparatus is controlled to take M' (M': an integer) greater than M and compare the size of the input data with sizes M' times as much as the plurality of sizes of recording sheets.

28 Claims, 10 Drawing Sheets

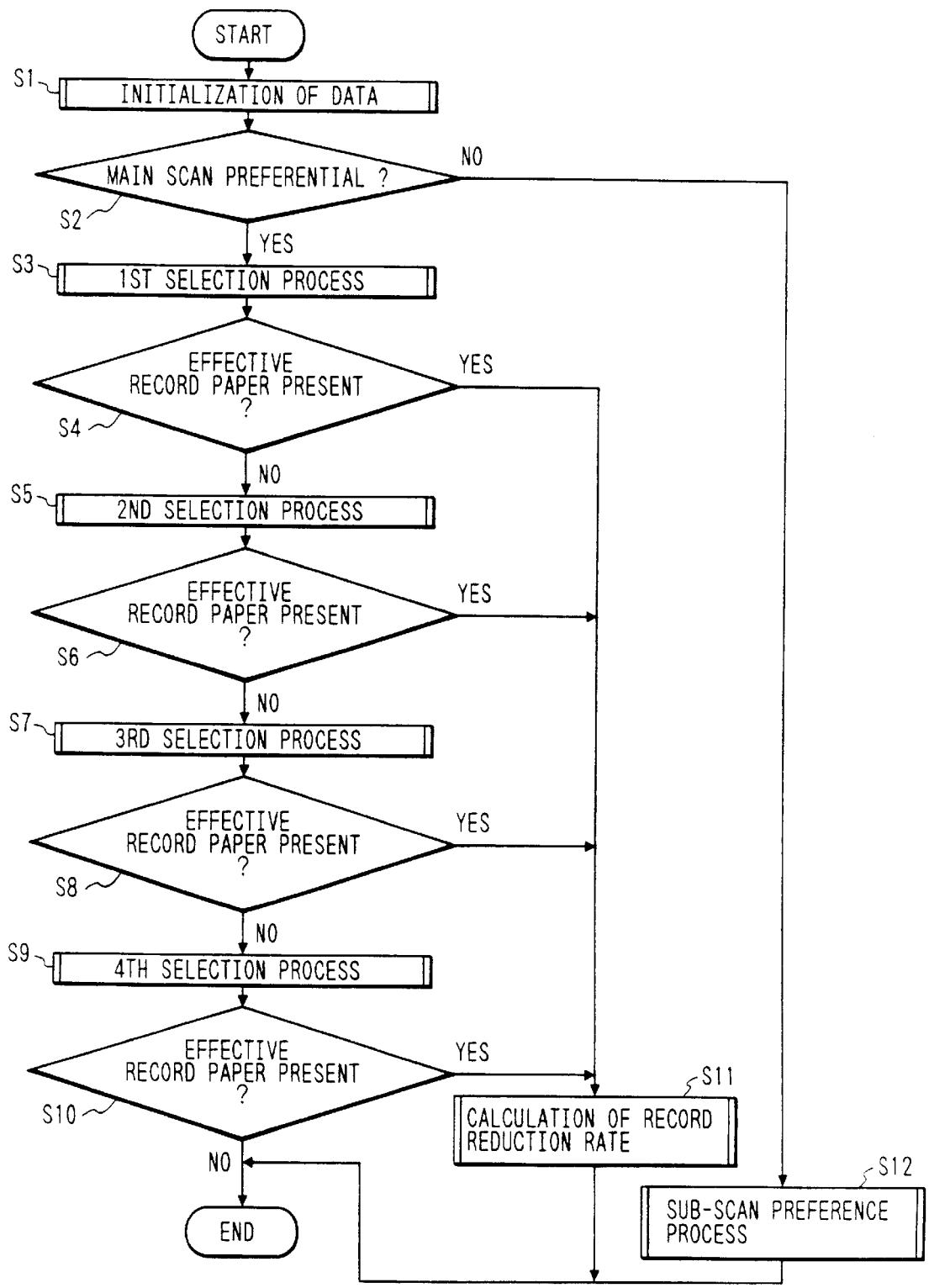

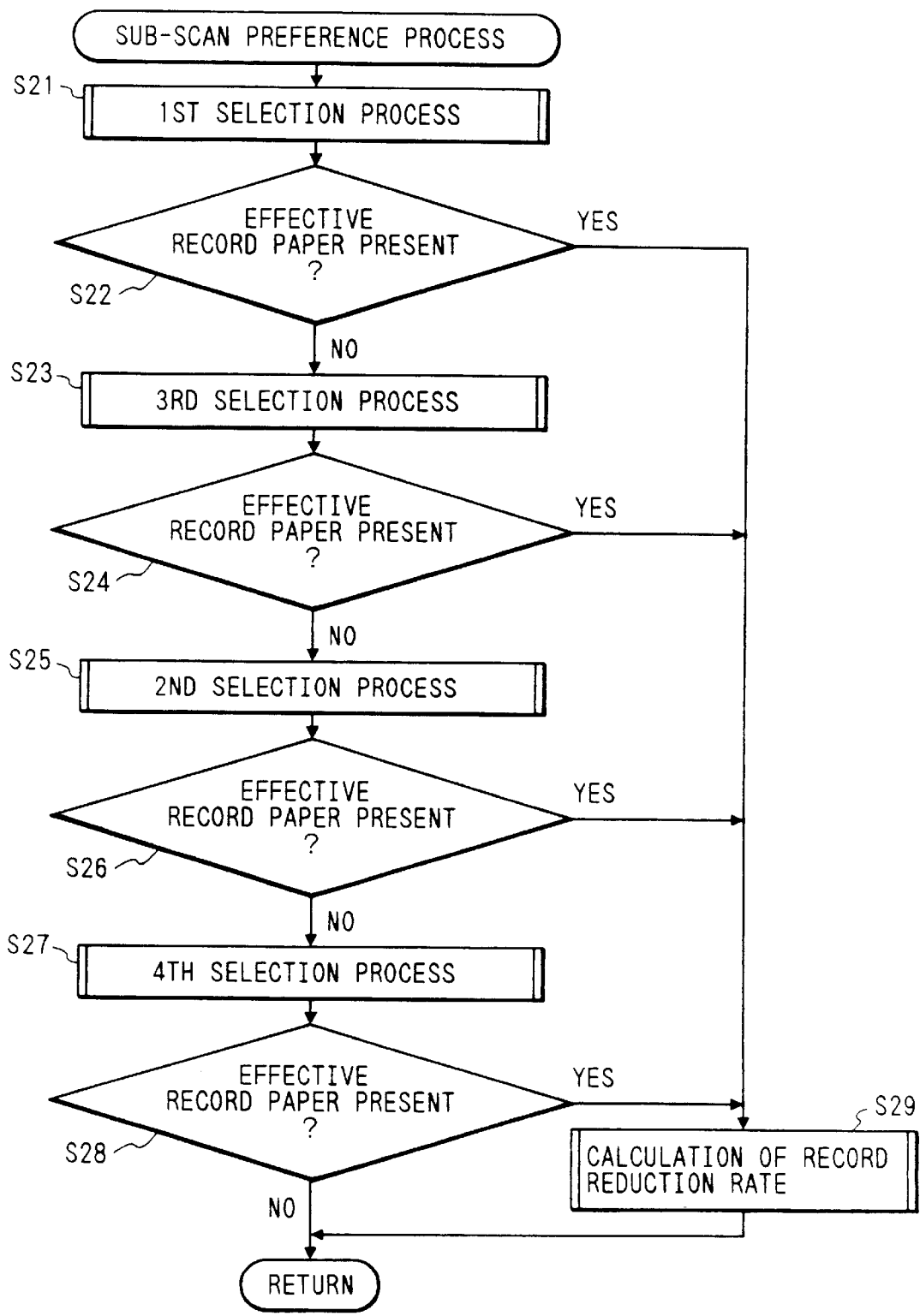

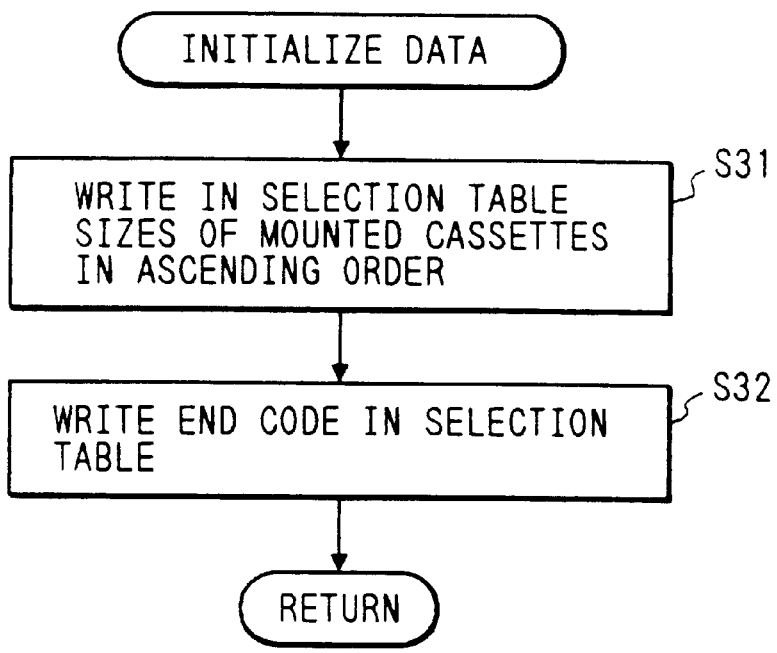

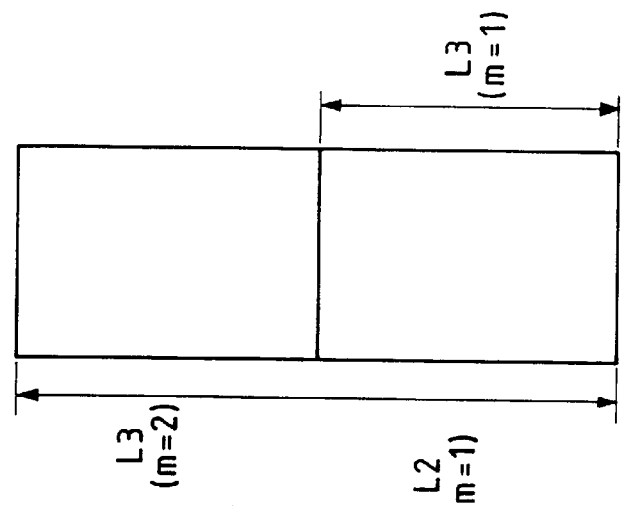
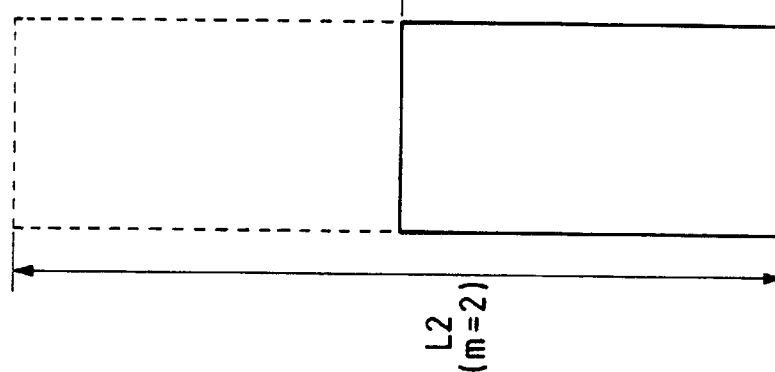
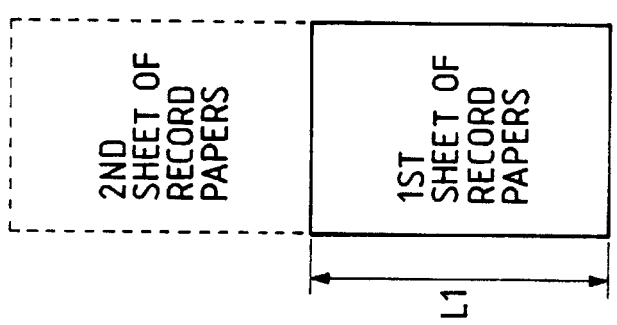
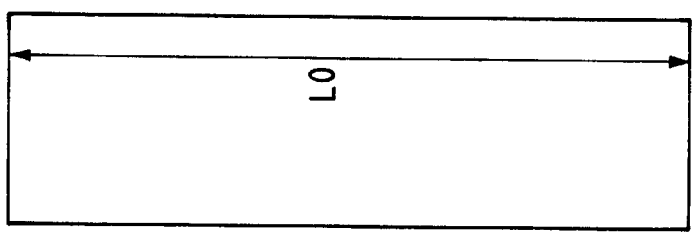

FACSIMILE APPARATUS FOR RECORDING IMAGE INFORMATION ON A RECORD SHEET OF PREDETERMINED SIZE

This is a Divisional Application of U.S. Ser. No. 08/990,779, filed Dec. 15, 1997, which is a continuation of U.S. Ser. No. 08/388,847, filed Feb. 15, 1995, now abandoned.

BACKGROUND OF THE INVENTION

1. Field of the Invention

The present invention relates to a facsimile apparatus, and more particularly to a facsimile apparatus for recording received image information on a record sheet of a predetermined size.

2. Related Background Art

In the prior art, when image information received by an own terminal from a sending terminal (hereinafter referred to as received document image) is to be recorded on a record sheet (cut form) of a predetermined size such as A4 or B5, a sub-scan length of one page of received document image is compared with an effective sub-scan length of one page of record sheet accommodated in a facsimile apparatus to calculate a reduction factor or a number of divisions to record the received document image on the record sheet, and the received image is recorded on the record sheet in accordance with the calculated reduction factor of the number of divisions.

Namely, in the prior art, the sub-scan length of the received document image is compared with the effective sub-scan length of the record sheet, and if it indicates that the received document image can be recorded on the record sheet when it is reduced at a maximum reduction factor (for example, 0.90) which the facsimile apparatus has, the received document image is recorded on the record sheet at an appropriate reduction factor, and if the received document sheet will spread out of the record sheet when it is reduced at the maximum reduction factor, the received document image is split-recorded on two or more record sheets.

In the prior art, however, when the received document image is recorded with reduction, it is recorded on one record sheet, but when the received document image is reduced at the maximum reduction factor, the recorded image is too reduced to present an easy-to-view image.

Further, when the sub-scan length of the received document image is long and the received document image is split-recorded on two or more record sheets, the reduction function is not operative. Thus, if the sub-scan length of the received document image is slightly longer than a length which is an integer multiple of the sub-scan length that can be recorded on the cut sheet of a given size, a record sheet which records only a portion of the image corresponding to the slightly longer image portion is additionally used. Namely, for example, if the slightly longer image portion is not present, only two record sheets are used, but if the slightly longer image portion is present, three record sheets are used, which leads to the waste of the record sheet.

SUMMARY OF THE INVENTION

It is an object of the present invention to provide an improved facsimile apparatus.

It is another object of the present invention to provide a facsimile apparatus which allows the recording of the received document image at an optimum number of splits and an optimum reduction factor, and permits the recording of the received document image on a record sheet with an optimum reduction rate even in the split-record mode.

BRIEF DESCRIPTION OF THE DRAWINGS

FIG. 2 shows a flow chart of a record sheet selection process, FIG. 3 shows a flow chart of a sub-scan priority process, FIG. 4 shows a flow chart of a data initialization process, FIG. 5 shows an example of a selection table, FIGS. 11A to 11D show examples of a received document image and an effective record sheet.

DETAILED DESCRIPTION OF THE PREFERRED EMBODIMENTS

Figure 1:
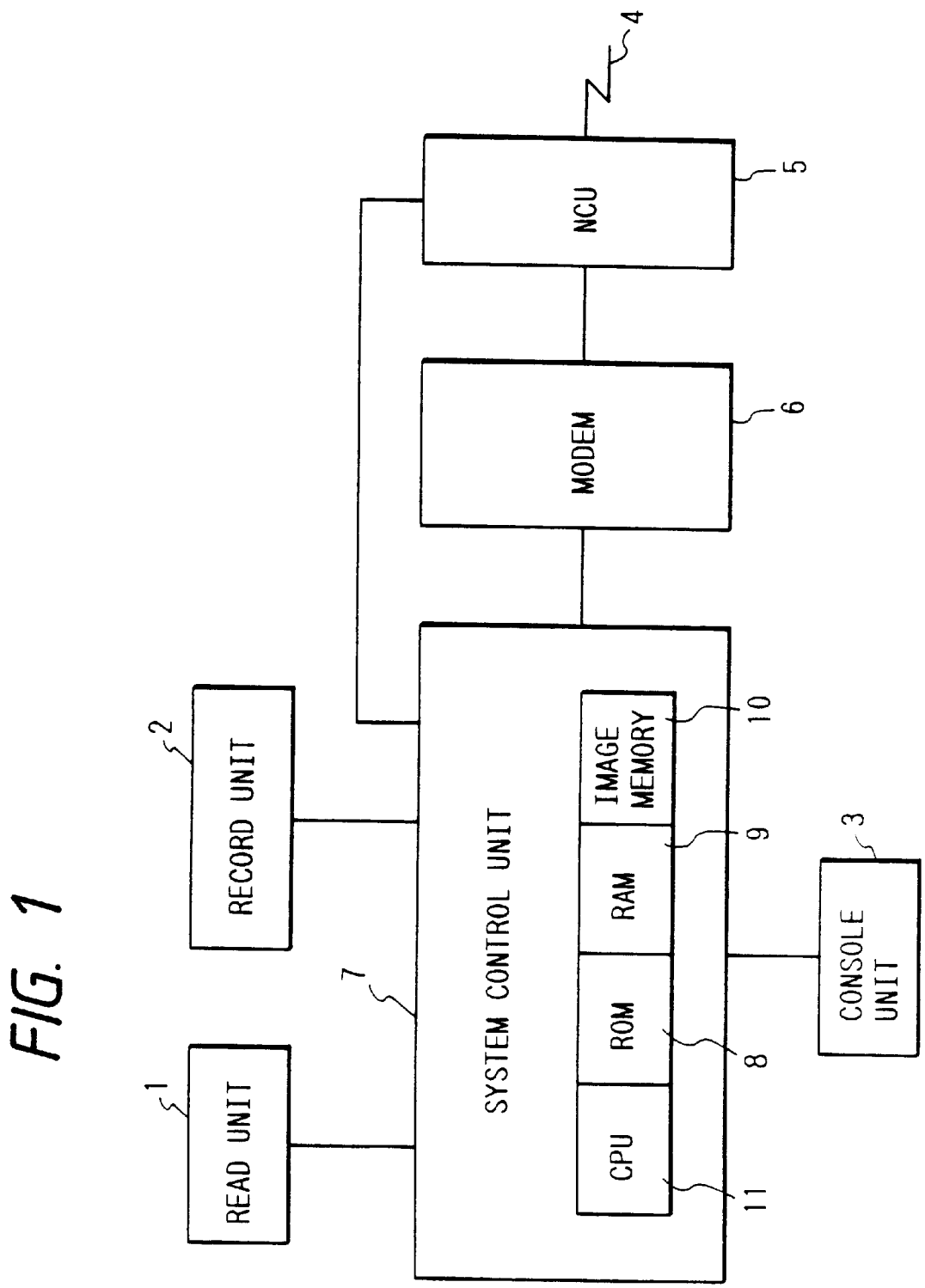
FIG. 1 shows a block diagram of one embodiment of a facsimile apparatus of the present invention.

FIG. 1 shows a block diagram of an embodiment of the facsimile apparatus of the present invention. The facsimile apparatus comprises a read unit 1 having a CCD for reading a main scan length and a sub-scan length of a received document image, a record unit 2 for recording the image information on a record sheet (cut sheet) of a predetermined size such as B5 or A4, a console unit 3 having various operation keys arranged and having a display function for displaying an operation status and a drive status of the apparatus, an NCU (network control unit) 5 for controlling image information sent from a predetermined network 4 and image information to be sent to the network 4, a modem (modulator/demodulator) 6 connected to the NCU 5 for modulating and demodulating the sending and received signals and a system control unit 7 connected to the read unit 1, the record unit 2, the console unit 3, the NCU 5 and the modem 6.

The system control unit 7 comprises a read-only ROM 8 which stores a predetermined operation program, a writable RAM 9 which stores information of a record sheet of a predetermined size on which the image information is to be recorded, an image memory 10 which temporarily stores the image information read by the read unit 1, and a CPU 11 for controlling an apparatus main unit (not shown) by conducting various operations.

While not shown, a plurality of record sheet containers (cassettes) are removably mounted on the apparatus main unit and a desired record sheet is appropriately selected from the plurality of sizes of record sheets accommodated in the cassettes by a selection process to be described later, and the received document image is recorded on the record sheet.

The facsimile apparatus calculates a reduction factor/number of splits in accordance with the main scan length and the sub-scan length of the received document image and the received document image is recorded on the desired record sheet (effective record sheet).

FIG. 2 shows a flow chart of a process of selection means for selecting an effective record sheet.

In a step S1, data is initialized and the sheet sizes of the cassettes mounted on the apparatus main unit are written.

In a step S2, whether the main scan is prioritized to select the effective record sheet or not is determined. Whether the effective record sheet is to be selected with the main scan priority or with the sub-scan priority is pre-registered by an operator with the consideration of convenience for editing the received document image.

If the decision in the step S2 is affirmative (YES), that is, if the main scan priority is selected, the process proceeds to a step S3 to execute a first selection routine. Namely, an effective record sheet which has the same main scan length as that of the received document image and allows the recording without splitting the received document image along the sub-scan direction.

In a step S4, whether the effective record sheet has been detected in the step S3 or not is determined,. and if the effective record sheet has not been detected, the process proceeds to a step S5 to execute a second selection process routine. Namely, an effective record sheet which has the same main scan length as that of the received document image and allows the recording of the received document image without split along the sub-scan direction is searched.

In a step S6, whether the effective record sheet has been detected in the step S5 or not is determined, and if the effective record sheet has not been detected, the process proceeds to a step S7 to execute a third selection process routine. Namely, a record sheet which has a different main scan length from that of the received document image and allows the recording of the received document image without split along the sub-scan direction is searched.

In a step S8, whether the effective record sheet has been detected in the step S7 or not is determined, and if the effective record sheet has not been detected, the process proceeds to a step S9 to execute a fourth selection process routine. Namely, an effective record sheet which has a different main scan length from that of the received document image and allows the recording of the received document image with split along the sub-scan direction is searched.

In a step S10, whether the effective record sheet has been detected in the step S9 or not is determined. If the effective record sheet has not been detected, namely, if it is determined that the effective record sheet is not accommodated in any of the cassettes, the program is terminated.

On the other hand, if the decision in any of the steps S4, S6, S8 and S10 is affirmative (YES), namely, if the effective record sheet is detected, the process proceeds to a step S11 to execute a record reduction factor calculation routine to calculate an optimum reduction factor to the received document image, and the program is terminated.

If the decision in the step S2 is negative (NO), namely, if the effective record sheet is to be selected not by the main scan priority but by the sub-scan priority, the process proceeds to a step S12 to execute a sub-scan priority process routine, and the program is terminated.

As shown in a flow chart of FIG. 3, in the sub-scan priority process, unlike the main scan priority process, the first selection process, the third selection process, the second selection process and the fourth selection process are executed in this sequence.

Specifically, in a step S21, the first selection process routine is executed and an effective record sheet which has the same main scan length as that of the received document image and allows the recording of the received document image without split along the sub-scan direction is searched. In a step S22, whether the effective record sheet has been detected in the step S21 or not is determined, and if the effective record sheet has not been detected, the process proceeds to a step S23 to execute the third selection process routine to search an effective record sheet which has a different main scan length from that of the received document image and allows the recording of the received document image without split along the sub-scan direction. In a step S24, whether the effective record sheet has been detected in the step S23 or not is determined, and if the effective record sheet has not been detected, the process proceeds to a step S25 to execute the second selection process routine to search an effective document sheet which has the same main scan length as that of the received document image and allows the recording of the received document image with split along the sub-scan direction. In a step S26, whether the effective record sheet has been detected in the step S25 or not is determined, and if the effective record sheet has not been detected, the process proceeds to a step S27 to execute the fourth selection process routine. Namely, an effective document sheet which has a different main scan length from that of the received document image and allows the recording of the received document image with split along the sub-scan direction is searched. In a step S28, whether the effective record sheet has been detected in the step S27 or not is determined, and if the effective record sheet has not been detected, the program is terminated.

On the other hand, if the decision in any of the steps S22, S24, S26 and S28 is affirmative (YES), namely, if the effective record sheet has been detected, the process proceeds to a step S29 to execute the record reduction factor calculation routine to calculate an optimum reduction factor to the received document image, and the program is terminated.

A data initialization process, the first to fourth selection processes and the record reduction factor calculation process are explained in detail.

(1) Data Initialization

FIG. 4 shows a flow chart of an initialization routine to be executed in the step S1 of FIG. 2.

The data is initialized writing the sizes of the cassette mounted on the apparatus main unit in a selection table in the RAM 9 in an ascending order (step S31) and finally writing an end code (step S32), and the process returns to the main routine (FIG. 2).

In the present embodiment, the selection table is written in the ascending order of the sheet size, for example, B5, A4, B4 for the table selection number n (n=1 to 4) as shown in FIG. 5, and finally the write end code END is written.

(2) First Selection Process

Figure 6:
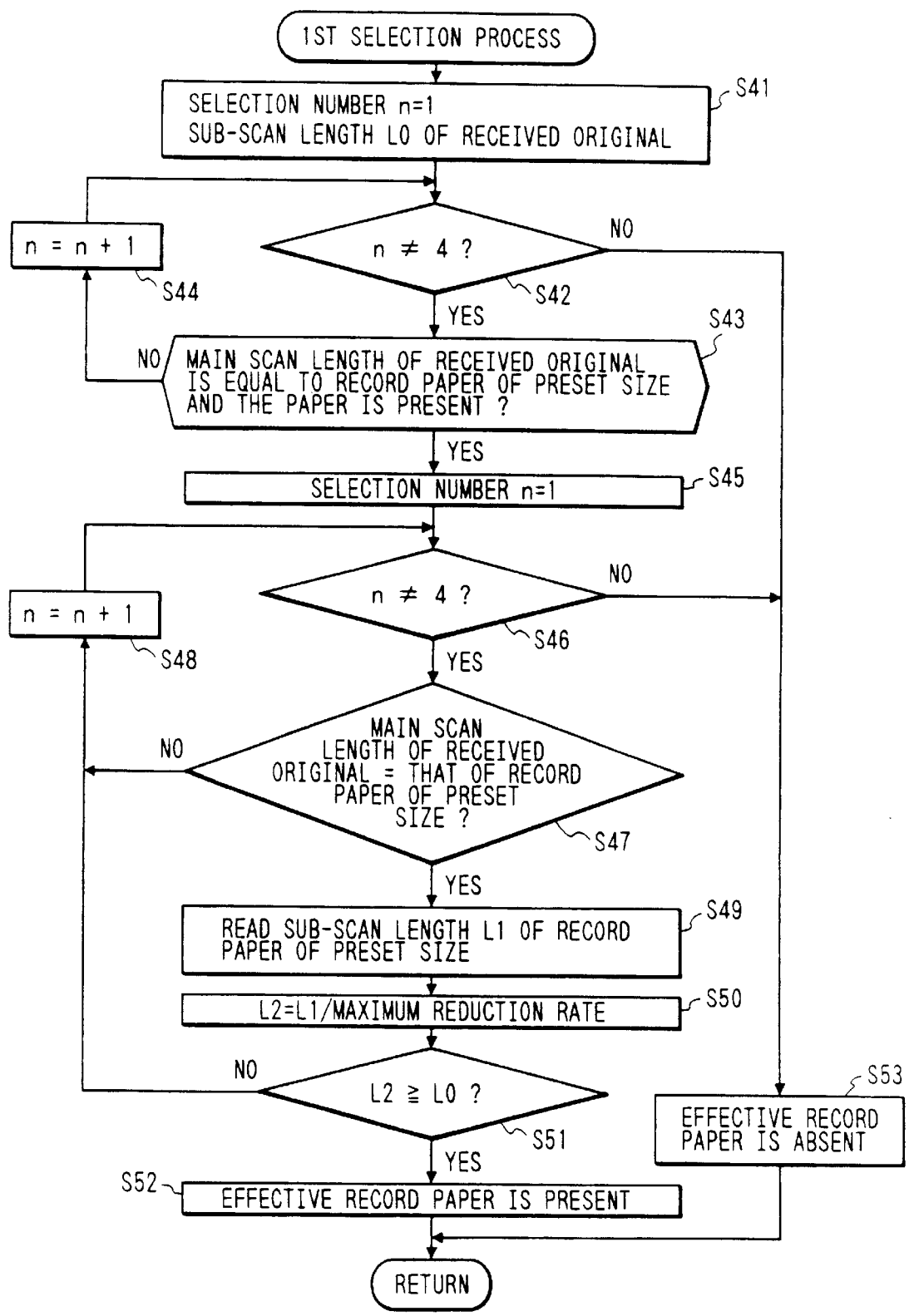
FIG. 6 shows a flow chart of a first selection process.

FIG. 6 shows a flow chart of the first selection process to be executed in the step S3 of FIG. 2 or the step S21 of FIG. 3. A record sheet which has the same main scan length as that of the received document image and allows the recording of the received document image without split is searched.

In a step S41, the selection number n of the selection table is set to '1' and the sub-scan length L0 of one page of received document image is read to initialize it.

In a step S42, whether the selection number n is other than '4' (end code) or not is determined. Since the selection number n has been set to '1' in the step S41, the decision of the step S42 in the first loop is affirmative (YES) and the process proceeds to a step S43 to determine whether the main scan length of the given sheet size (for example, B5) is same as that of the received document image and the sheets in the cassette have not been exhausted or not. If the decision is affirmative (YES), the process proceeds to a step S45, and if the decision is negative (NO), the selection number n is incremented by one in a step S44 and the flow of the steps S42 to S43 is repeated. Namely, in the first loop, the selection number is set to '1' and in the step S43, whether the main scan length of the received document image is same as that of the B5 size and the record sheet is accommodated in the B5 cassette or not is determined. If the main scan length of the received document image is not same as that of the B5 size or if the record sheet is not accommodated in the B5 cassette, the selection number n is incremented by one. Namely, n=2 and the decision in the step S42 is again affirmative (YES), and in the step S43, whether the main scan length of the received document image is same as that of the A4 size (n=2) and the record sheet is accommodated in the A4 cassette or not is determined. The same process is repeated until the selection number n reaches '4', when it is determined that the effective record sheet is not present (step S53) and the process returns to the routine of FIG. 2 or FIG. 3.

On the other hand, if the decision of the step S43 is affirmative (YES), namely, if the record sheet which has the same main scan length as that of the received document image has been detected, steps S45 et seq. are executed to determine whether the received document image can be recorded without split.

Namely, in the step S45, the selection number n is set to '1' to initialize the data again. In a step S46, whether the selection number is other than '4' or not is determined. Since the selection number n has been set to '1' in the step S45, the decision of the step S46 in the first loop is affirmative (YES) and the process proceeds to a step S47 to determine whether the main scan length of the given sheet size is same as that of the received document image or not. If the decision is negative (NO), the selection number n is incremented by one in a step S48, and the decision process of the steps S46 to S47 is repeated as the steps S42 and S43 are. If the decision of the step S46 is negative (NO), namely, if the selection number n reaches '4', it is determined that the effective record sheet is not present (step S53) and the process returns to the routine of FIG. 2 or FIG. 3.

If the decision in the step S47 is affirmative (YES), namely, if the effective record sheet which has the same main scan length as that of the received document image has been detected, the sub-scan length L1 of the sheet size, for example, the sub-scan length L1 of the B5 size is read (step S49), and the sub-scan length L1 is divided by a maximum reduction factor D (first predetermined reduction factor) to calculate a maximum effective sub-scan length L2 (step S50). The process proceeds to a step S51 to determine whether the maximum effective sub-scan length L2 is longer than or equal to the sub-scan length L0 of the received document image or not. If the decision is negative (NO), the selection number n is incremented by one in the step S48 and the flow of the steps S46 to S50 is repeated.

If the decision in the step S51 is affirmative (YES), it is determined that the effective record sheet which allows the recording of the received document sheet without split has been determined (step S52) and the process returns to the routine of FIG. 2 or FIG. 3.

In this manner, the received document sheet can be recorded without split for the record sheet having the same main scan length as that of the received document image.

(3) Second Selection Process

Figure 7:
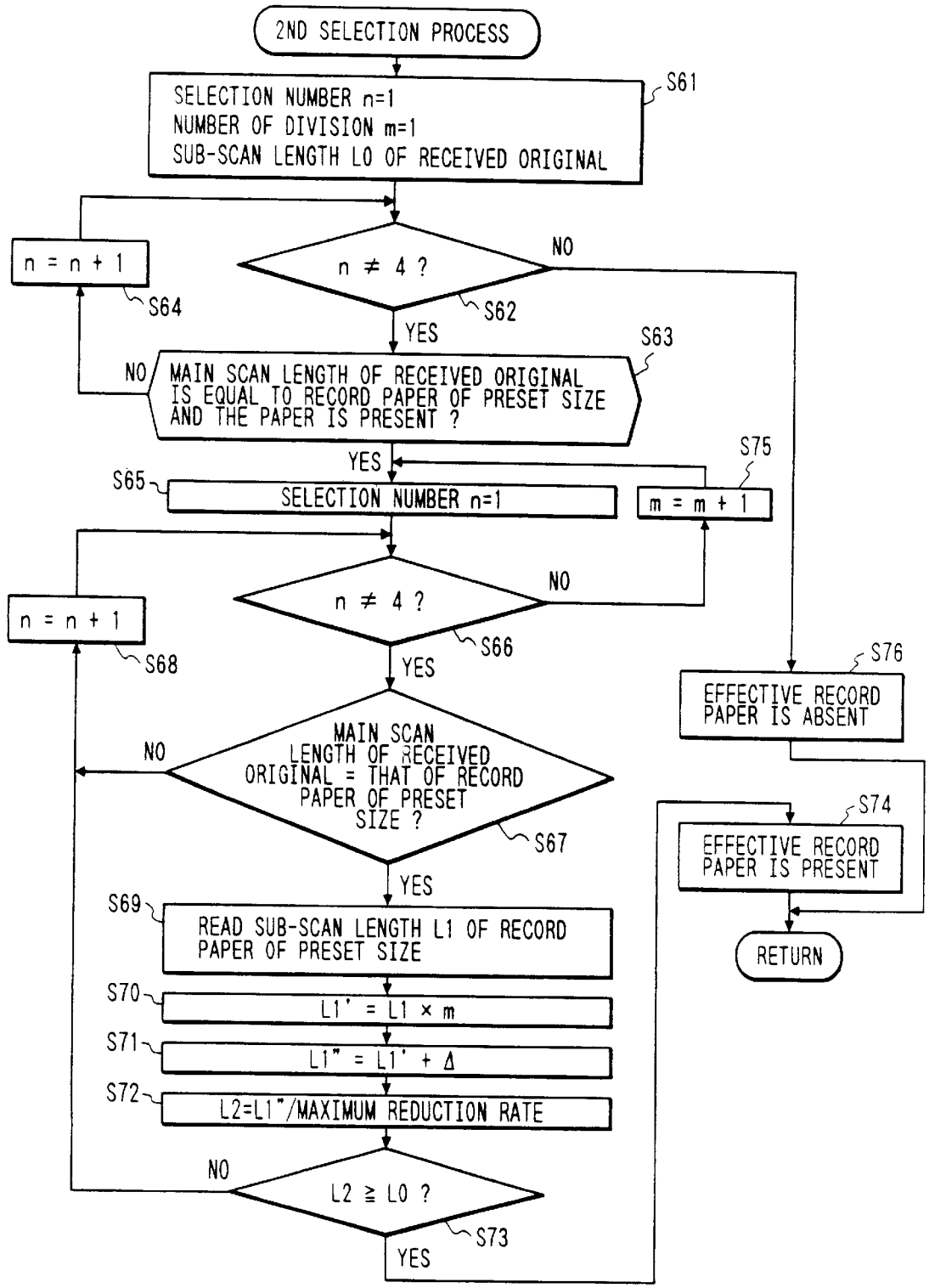
FIG. 7 shows a flow chart of a second selection process.

FIG. 7 shows a flow chart of the second selection process to be executed in the step S5 of FIG. 2 or the step S25 of FIG. 3. It determines how many record sheets the received document image is to be split into for the record sheet having the same main scan length as that of the received document sheet.

In a step S61, the selection number n is set to '1' and the number of split m is set to '1', and the sub-scan length L0 of one page of received document image is read to initialize the data.

In a step S62, whether the selection number n is other than '4' (end code) or not is determined. Since the selection number n has been set to '1' in the step S61, the decision of the step S62 in the first loop is affirmative (YES) and the process proceeds to a step S63 to determine whether the main scan length of the given sheet size is same as that of the received document image and the sheet of the cassette have not been exhausted or not. If the decision is affirmative (YES), the process proceeds to a step S65, and if the decision is negative (NO), the selection number n is incremented by one in a step S64 and the flow of the steps S62 to S63 is repeated as the steps S42 to S43 are. If the decision in the step S62 is negative (NO), namely, if the selection number n reaches '4', it is determined that the effective record sheet has not been detected (step S76) and the process returns to the routine of FIG. 2 or FIG. 3.

On the other hand, if the decision in the step S63 is affirmative (YES), namely, if the record sheet having the same main scan length as that of the received document image has been detected, steps S66 et seq. are executed to determine the number of split m.

In the step S65, the selection number n is set to '1' to initialize the data again. In the step S66, whether the selection number is other than '4' or not is determined. Since the selection number n has been set to '1' in the step S65, the decision in the step S66 in the first loop is affirmative (YES) and the process proceeds to a step S67 to determine whether the main scan length of the given sheet size is same as that of the received document image or not. If the decision is negative (NO), the selection number n is incremented by one in a step S68 and the flow of the steps S66 to S67 is repeated as the steps S62 to S63 are. If the decision in the step S67 is affirmative (YES), namely, if the sheet size having the same main scan length as that of the received document image has been detected, the sub-scan length L1 of the given sheet size (for example, B5) is read (step S69). Then, the sub-scan length L1 is multiplied by the number of split m to calculate a new sub-scan length L1' (step S70), and a cut-away length Δ which may spread out of the sub-scan length for the number of split is added to the sub-scan length L1' to calculate a new sub-scan length L1" (step S71). The sub-scan length L1" is divided by the maximum reduction factor D (first predetermined reduction factor) to calculate a maximum effective sub-scan length L2 (step S72). Then, the process proceeds to a step S73 to determine whether the maximum effective sub-scan length L2 is longer than or equal to the sub-scan length L0 of the received document image or not. If the decision is negative (NO), the selection number n is incremented by one in a step S68 and the flow of the steps S66 to S72 is repeated, and when the decision in the step S66 in the subsequent loop is negative (NO), it is determined that the sub-scan length of any record sheet accommodated in the cassettes is shorter than the sub-scan length of the received document image, and the number of split m is incremented by one and the flow of the steps S65 to S72 is executed again. If the decision in the step S73 is affirmative (YES), it is determined that the effective record sheet has been detected (step S74) and the process returns to the routine of FIG. 2 or FIG. 3. Namely, the sheet size having the same main scan length as that of the received document image is detected by the selection number n and the number of split m is determined in accordance with the detected sheet size. The received document image is recorded on the record sheet at the latest updated number of split m.

In this manner, when the main scan length is same as that of the received document image and the sub-scan length L0 of the received document image is long, it is split-recorded into m effective record sheets.

(4) Third Selection Process

Figure 8:
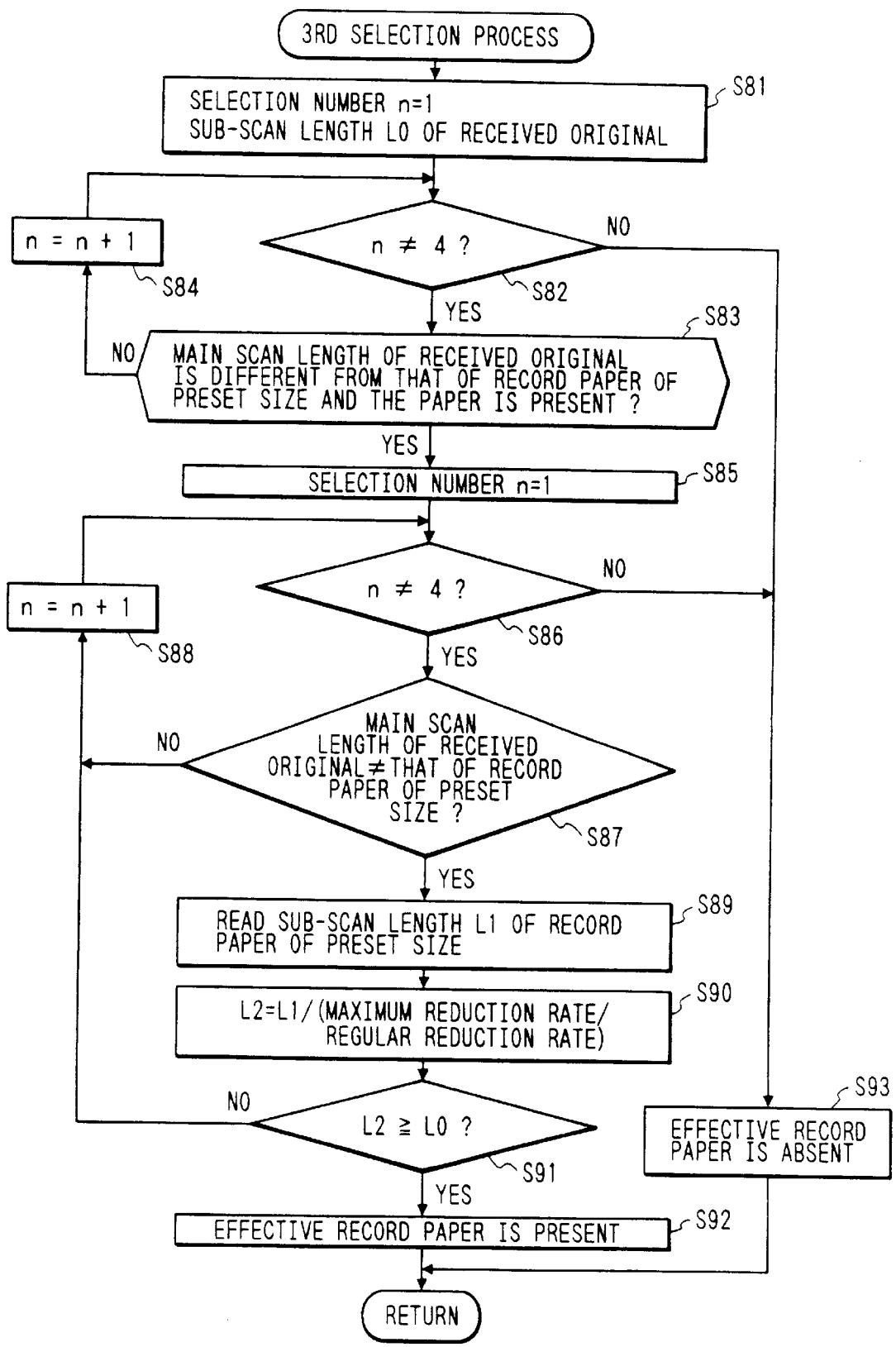
FIG. 8 shows a flow chart of a third selection process.

FIG. 8 shows a flow chart of the third selection process to be executed in the step S7 of FIG. 2 or the step S23 of FIG. 3. It determines whether the received document image can be recorded on the record sheet having a different main scan length from that of the received document image without split or not.

Namely, in a step S81, like in the first selection process (FIG. 6), the selection table number n is set to '1' and the sub-scan length L0 of one page of received document image is read to initialize the data.

In a step S82, whether the selection number n is other than '4' or not is determined. Since the selection number n has been set to '1' in the step S81, the decision in the step S82 in the first loop is affirmative (YES) and the process proceeds to a step S83 to determine whether the main scan length of the sheet size is different from that of the received document image and the sheet in the cassette has not been exhausted or not. If the decision is affirmative (YES), the process proceeds to a step S85, and if the decision is negative (NO), the selection number n is incremented by one in a step S84 and the flow of the steps S82 to S83 is repeated. Namely, in the first loop, the selection number n is set to '1' and whether the document sheet of a different main scan length from that of the B5 size is accommodated in the cassette or not is determined. If the decision in negative (NO), the selection number n is incremented by one, and whether the record sheet having the different main scan length from that of the A4 size is accommodated in the cassette or not is determined. A similar process is repeated until the selection number n reaches '4'. If the decision in the step S82 is negative (NO), namely, if the selection number n has reached '4', it is determined that the effective record sheet is not present (step S93) and the process returns to the routine of FIG. 2 or FIG. 3.

On the other hand, if the decision in the step S83 is affirmative (YES), namely, if the record sheet having a different main scan length from that of the received document image has been detected, steps S85 et seq. are executed to determine whether the received document image can be recorded without split. Namely, in the step S85, the selection number n is set to '1' to initialize the data again. In a step S86, whether the selection number is other than '4' or not is determined. Since the selection number has been set to '1' in the step S85, the decision in the step S86 in the first loop is affirmative (YES) and the process proceeds to a step S87 to determine whether the main scan length of the sheet size is different from that of the received document image or not. If the decision in the step S87 is negative (NO), the selection number n is incremented by one in a step S88 and the decision steps S86 to S87 is repeated as the steps S82 to S83 are. If the decision in the step S86 is negative (NO), namely, if the selection number has reached '4', it is determined that the effective record sheet has not been detected (step S93) and the process returns to the routine of FIG. 2 or FIG. 3.

If the decision in the step S87 is affirmative (YES), namely, if the main scan length of the given sheet size is different from that of the received document image, the sub-scan length L1 of the given sheet size, for example, the sub-scan length L1 of the B5 size is read (step S89) and then the sub-scan length L1 is divided by the maximum reduction factor D (first predetermined reduction factor) and a constant form reduction factor E (second predetermined reduction factor) to calculate a maximum effective sub-scan length L2 (step S90). Namely, since the main scan length of the received document image is different from that of the given sheet size, the sub-scan length L1 is divided by the maximum reduction factor D as well as the constant form reduction factor E to calculate the maximum effective sub-scan length L2. For example, when the main scan length is that of the size A4 for the received document image and that of the size B5 for the given sheet size, the constant form reduction factor E is 0.86 and the sub-scan length L1 is divided by the predetermined maximum reduction factor D (for example, 0.90) and the constant form reduction factor E to calculate the maximum effective sub-scan length L2.

In a step S91, whether the maximum effective sub-scan length L2 is longer than the sub-scan length L0 of the received document image or not is determined. If the decision is negative (NO), the selection number n is incremented by one and the flow of the steps S86 to S90 is repeated.

If the decision in the step S91 is affirmative (YES), it is determined that the effective record sheet is present (step S92) and the process returns to the routine of FIG. 2 or FIG. 3.

In this manner, the received document image can be recorded without split for the record sheet having a different main scan length from that of the received document image.

(5) Fourth Selection Process

Figure 9:
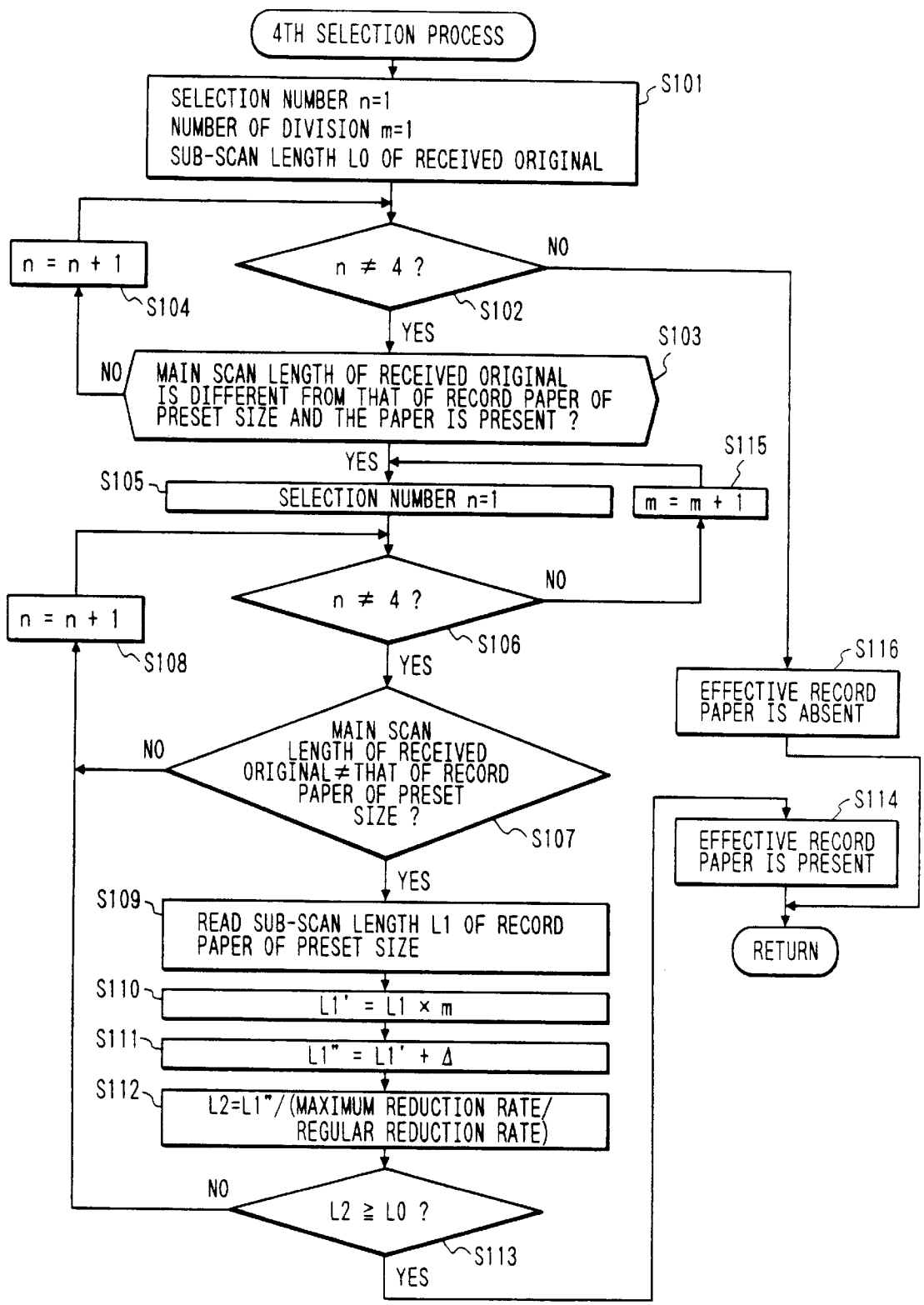
FIG. 9 shows a flow chart of a fourth selection process.

FIG. 9 shows a flow chart of the fourth selection process to be executed in the step S9 of FIG. 2 or the step S27 of FIG. 3. It determines how many record sheets the received document image is to be split-recorded into for the record sheets having a different main scan length from that of the received document image.

In a step S101, the selection number n is set to '1' and the number of split m of the record sheets is set to '1', and the sub-scan length L0 of one page of received document image is read to initialize the data.

In a step S102, whether the selection number n is other than '4' or not is determined. Since the selection number n has been set to '1' in the step S101, the decision in the step S102 in the first loop is affirmative (YES) and the process proceeds to a step S103 to determine whether the main scan length of the given sheet size is different from that of the received document image and the record sheet has not been exhausted or not. If the decision is affirmative (YES), the process proceeds to a step S105 and if the decision is negative (NO), the selection number n is incremented by one in a step S104 and the flow of the steps S102 to S103 is repeated as the steps S82 to S83 are. If the decision of the step S102 is negative (NO), namely, if the selection number n has reached '4', it is determined that the effective record sheet is not present (step S116) and the process returns to the routine of FIG. 2 or FIG. 3.

On the other hand, if the decision in the step S103 is affirmative (YES), namely, if the record sheet having a different main scan length from that of the received document image is present, steps S105 et seq. are executed to determine the number of split m. Namely, in the step S105, the selection number n is set to '1' and the data is initialized again. In a step S106, whether the selection number n is other than '4' or not is determined. Since the selection number n has been set to '1' in the step S105, the decision in the step S106 in the first loop is affirmative (YES) and the process proceeds to a step S107 to determine whether the main scan length of the given sheet size is different from that of the received document image or not. If the decision is negative (No), the selection number n is incremented by one in a step S108 and the flow of the steps S106 to S107 is repeated as the steps S102 to S103 are. If the decision in the step S107 is affirmative (YES), namely, if the main scan length of the given sheet size is different from that of the received document image, the sub-scan length L1 of the given sheet size, for example, the sub-scan length L1 of the B5 size is read (step S109). Then, the sub-scan length L1 is multiplied by the number of split m to calculate a new sub-scan length L1' (step S110) and a cut-away length A which spreads out of the sub-scan length for the number of split m is added to the sub-scan length L1' to calculate a new sub-scan length L1" (step S111). Like in the step S90, the sub-scan length L1" is divided by the maximum reduction factor D (first predetermined reduction rate) and the constant form reduction rate E (second predetermined reduction factor) to calculate a maximum effective sub-scan length L2 (step S112). Then, in a step S113, whether the maximum effective sub-scan length L2 is longer than the sub-scan length L0 of the received document image or not is determined. If the decision is negative (NO), the selection number is incremented by one in the step S108, and if the decision in the step S106 is negative (NO), it is determined that the sub-scan length of any record sheet accommodated in the cassettes is shorter than the sub-scan length of the received document image, and the number of split m is incremented by one to increase the number of split (step S107), and the flow of the steps S105 to S112 is repeated again. If the decision in the step S113 is affirmative (YES), it is determined that the effective record sheet is present (step S114) and the process returns to the routine of FIG. 2 or FIG. 3. Namely, the sheet size having a different main scan length from that of the received document image is detected by the selection number n and the number of split m is determined in accordance with the sheet size. The received document image is recorded on the record sheet at the latest updated number of split m.

In this manner, when the main scan length is different from that of the received document image and the sub-scan length of the received document image is longer than that of the record sheet, the received document image is split-recorded on m effective record sheets.

(6) Calculation of Record Reduction Factor

Figure 10:
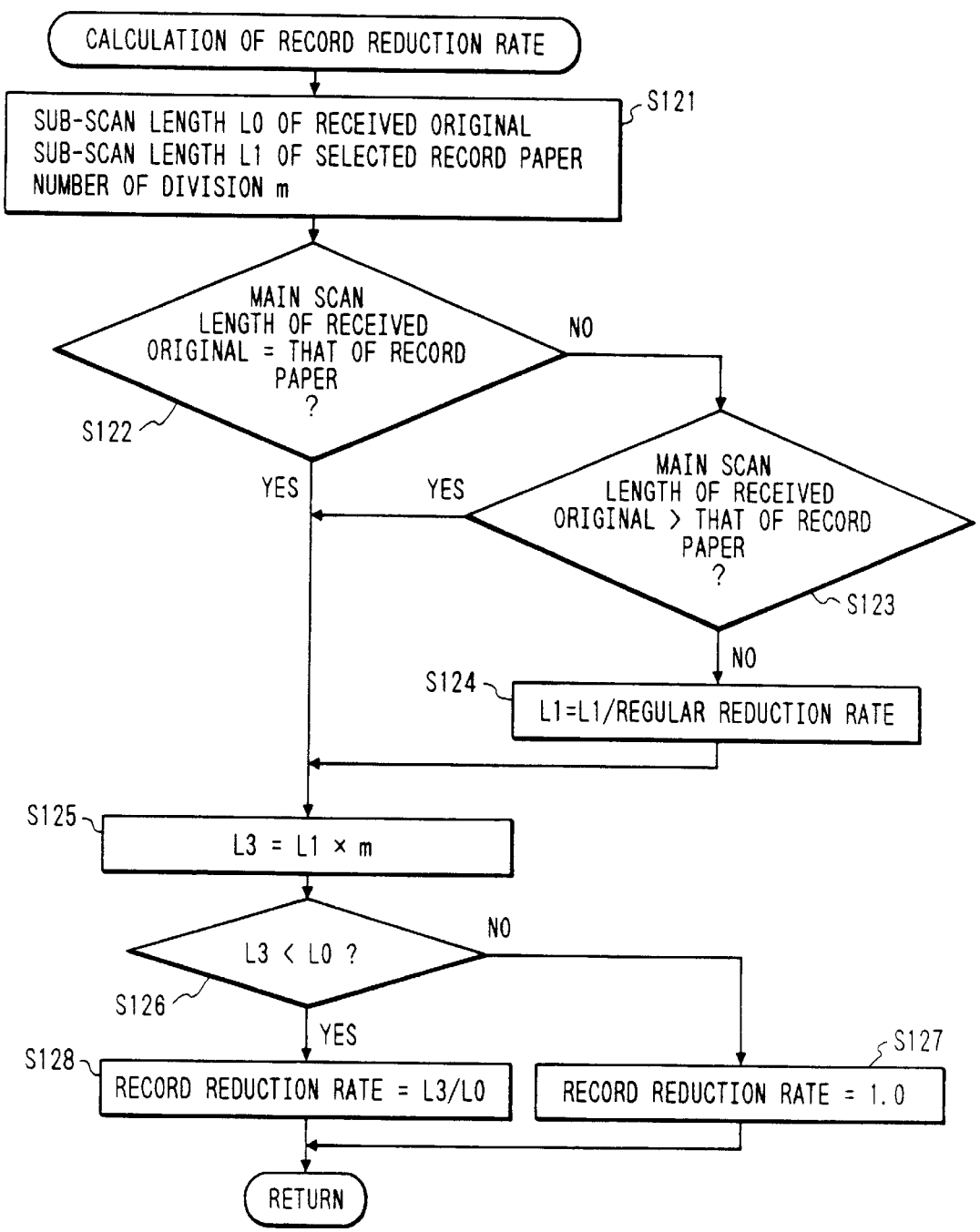
FIG. 10 shows a flow chart of a recording reduction factor calculation process.

FIG. 10 shows a flow chart of the record reduction factor calculation process to be executed in the step S11 of FIG. 2 or the step S29 of FIG. 3. It calculates the record reduction factor R at which the received document image is recorded on the effective record sheet based on the sub-scan length L0 of the received document image set in the first to fourth selection processes (FIG. 6 to FIG. 9), the effective record sheet sub-scan length L1 and the number of split m.

In a step S121, the sub-scan length L0 of the received document image, the sub-scan length L1 of the effective record sheet and the number of split m are read, and in a step S122, whether the main scan length of the received document image is same as that of the effective record sheet or not is determined. If the decision is affirmative (YES), the process proceeds to a step S125, and if the decision is negative (NO), whether the main scan length of the received document image is longer than the main scan length of the effective record sheet or not is determined (step S123). If the decision in the step S123 is affirmative (YES), the process proceeds to the step S125, and if the decision is negative (NO), namely, if the main scan length of the received document image is shorter than that of the effective record sheet, the sub-scan length L1 of the effective record sheet is divided by the constant form reduction factor E to calculate a new sub-scan length L1 (step S124) and the process proceeds to the step S125.

In the step S125, the sub-scan length L1 is multiplied by the number of split m to calculate a record sub-scan length L3, and whether the record sub-scan length L3 is shorter than the sub-scan length L0 of the received document image or not is determined (step 126). If the decision is negative (NO), namely, if the sub-scan length L0 of the received document image is longer, the record reduction factor is set to 1.0 (step S127) and the program is terminated. On the other hand, if the decision in the step S126 is affirmative (YES), namely, if the sub-scan length L3 of the record sheet is longer, the sub-scan length L3 is divided by the sub-scan length L0 of the received document image to calculate the record reduction factor (step S128), and the program is terminated.

In this manner, the received document image can be recorded at the record reduction factor determined by the number of split m so that the received document image is recorded on the m record sheets at the desired reduction factor without wasting the record sheet.

FIGS. 11A to 11D show an example of the received document image and the effective record sheet in which the main scan length of the received document image is equal to that of the record sheet, and FIG. 11A shows a received document image. FIG. 11B shows a record sheet (cut sheet), FIG. 11C shows an effective scan length of the record sheet on which the reduction recording is to be made, and FIG. 11D shows the split recording of the received document image.

As seen from FIGS. 11A to 11D, when the sub-scan length L0 of the received document image is longer than that of the record sheet, the effective sub-scan length L2 is calculated as shown in FIG. 11C and the number of split m and the reduction factor R are calculated in accordance with the effective sub-scan length to attain the split recording as shown in FIG. 11D.

The present invention is not limited to the illustrated embodiments but many modifications may be made without departing from the spirits of the present invention. For example, while three types of sheet cassettes are mounted in the apparatus main body and three types of sheet sizes are written into the selection table in the embodiment, any plurality of types such as two or four or more may be used. In the former case, the apparatus may be reduced in size, and in the latter case, many type of sheet sizes are selectable without exchanging the cassettes.

What is claimed is:

1. A recording method, comprising:

inputting data;

detecting a size of the data inputted by said input step;

setting a plurality of selectable sizes of recording sheets;

setting a condition for selection from the plurality of sizes of recording sheets, by a user;

recording the data inputted by said input step, on a recording sheet; and a control step of selecting a size of recording sheet on which the input data is to be recorded, from the plurality of sizes of recording sheets set by said sheet size setting step, on the basis of a condition set by said condition setting step and the size of the input data detected by said detecting step, and then causing said recording step to record the input data on the selected recording sheet, wherein said control step makes a queue of virtual sizes of recording sheets of the mounted cassettes to a table in ascending order sizes of recording sheets by putting the sizes of recording sheets set by said sheet size setting step and virtual sizes obtained by variably magnifying the set sizes in ascending order, to accord with the condition set by said condition setting step, so as to provide a virtual queue of sizes, and then said control step compares the size of the input data with the virtual queue of sizes in order starting from the smallest size, and selects the first size of recording sheet corresponding to a size equal to or greater than the size of the input data.

2. A method according to claim 1, wherein said input step is a receiving step.

3. A method according to claim 1, wherein said recording step is performed by a facsimile apparatus.

4. A method according to claim 1, wherein said control step variably magnifies the plurality of sizes of recording sheets to be such sizes as obtained by the addition of ignorable data length to the plurality of sizes of recording sheets, respectively, so as to obtain the virtual sizes.

5. A method according to claim 1, wherein said control step variably magnifies the plurality of sizes of recording sheets to be greater regular sizes than the plurality of sizes of recording sheets, respectively, so as to obtain the virtual sizes.

6. A method according to claim 1, wherein said control step variably magnifies the plurality of sizes of recording sheets to be sizes integer times as much as the plurality of sizes of recording sheets, respectively, so as to obtain the virtual sizes.

7. A method according to claim 1, wherein said recording step utilizes recording means that is operable to mount a plurality of cassettes for recording sheets, and said setting step sets sizes of recording sheets of the mounted cassettes to a table in ascending order.

8. A method according to claim 1, wherein said condition setting step sets one of a main scan direction preference mode and a sub-scan direction preference mode, and wherein in the main scan direction preference mode, a size of recording sheet of which a length in a main scan direction accords with that in a main scan direction of the size of input data is preferentially selected, while in the sub-scan direction preference mode, a size of recording sheet of which a length in a sub-scan direction accords with that in a sub-scan direction of the size of input data is preferentially selected.

9. A recording apparatus, comprising:
 an input unit adapted to input data;
 a detecting unit adapted to detect a size of the data inputted by said input unit;
 a setting unit adapted to set a plurality of sizes of recording sheets;
 a recording unit adapted to record the data inputted by said input unit, on a recording sheet; and
 a control unit adapted to compare the size of the input data detected by said detecting unit with the plurality of sizes of recording sheets set by said setting unit, selecting a size of recording sheet on which the input data is to be recorded, from the plurality of sizes of recording sheets set by said setting unit, and causing said recording unit to record the input data on the selected recording sheet,
 wherein when no recording sheet of a size equal to or greater than the size of the input data is set, said control unit compares the size of input data with the sizes M times (M: an integer) as much as the plurality of sizes of recording sheets, respectively, and
  (1) if any of the M times sizes is equal to or greater than the size of the input data, said control unit selects it as a size of recording sheet on which the input data is to be recorded, and causes said recording unit to divisionally record the input data on M pieces of recording sheets having the selected size, and
  (2) if none of the M times sizes is equal to or greater than the size of the input data, said control unit increments M by one and again executes the process specified in (1) above.

10. An apparatus according to claim 9, wherein said recording unit is a facsimile apparatus.

11. An apparatus according to claim 9, wherein said control unit compares the size of the input data with sizes obtained by adding predetermined ignorable data length to the M times sizes, respectively.

12. An apparatus according to claim 9, wherein said control unit compares the sizes of the input data with sizes obtained by variably magnifying the M times sizes with an allowable magnification factor.

13. An apparatus according to claim 9, wherein said recording unit is operable to accept mounting of a plurality of cassettes for recording sheets, and said setting unit sets sizes of recording sheets of the mounted cassettes to a table.

14. An apparatus according to claim 9, wherein said input unit is a receiving unit.

15. A recording apparatus, comprising:
 an input unit adapted to input data;
 a detecting unit adapted to detect a size of the data inputted by said input unit;
 a sheet size setting unit adapted to set a plurality of selectable sizes of recording sheets;
 a condition setting unit adapted to set a condition for selection from the plurality of sizes of recording sheets, by a user;
 a recording unit adapted to record the data inputted by said input unit, on a recording sheet; and
 a control unit adapted to select a size of recording sheet on which the input data is to be recorded, from the plurality of sizes of recording sheets set by said sheet size setting unit, on the basis of a condition set by said condition setting unit and the size of the input data detected by said detecting unit, and then causing said recording unit to record the input data on the selected recording sheet,
 wherein said control unit makes a queue of virtual sizes of recording sheets of the mounted cassettes to a table in ascending order sizes of recording sheets by putting the sizes of recording sheets set by said sheet size setting unit and virtual sizes obtained by variably magnifying the set sizes in ascending order, to accord with the condition set by said condition setting unit, so as to provide a virtual queue of sizes, and then said control unit compares the size of the input data with the virtual queue of sizes in order starting from the smallest size, and selects the first size of recording sheet corresponding to a size equal to or greater than the size of the input data.

16. An apparatus according to claim 15, wherein said recording unit is a facsimile apparatus.

17. An apparatus according to claim 15, wherein said control unit variable-magnifies the plurality of sizes of recording sheets to be such sizes as obtained by the addition of ignorable data length to the plurality of sizes of recording sheets, respectively, so as to obtain the virtual sizes.

18. An apparatus according to claim 15, wherein said control unit variable-magnifies the plurality of sizes of recording sheets to be greater regular sizes than the plurality of sizes of recording sheets, respectively, so as to obtain the virtual sizes.

19. An apparatus according to claim 15, wherein said control unit variable-magnifies the plurality of sizes of recording sheets to be sizes integer times as much as the plurality of sizes of recording sheets, respectively, so as to obtain the virtual sizes.

20. An apparatus according to claim 15, wherein said recording unit is capable of mounting a plurality of cassettes for recording sheets, and said setting unit sets sizes of recording sheets of the mounted cassettes to a table in ascending order.

21. An apparatus according to claim 15, wherein said condition setting unit sets one of a main scan direction preference mode and a sub-scan direction preference mode, and wherein in the main scan direction preference mode, a size of recording sheet of which a length in a main scan direction accords with that in a main scan direction of the size of input data is preferentially selected, while in the sub-scan direction preference mode, a size of recording sheet of which a length in a sub-scan direction accords with that in a sub-scan direction of the size of input data is preferentially selected.

22. An apparatus according to claim 15, wherein said input unit is a receiving unit.

23. A recording method, comprising:

inputting data;

detecting a size of the data inputted by said inputting step;

setting a plurality of sizes of recording sheets;

recording the data inputted by said input step, on a recording sheet; and a control step of comparing the size of the input data detected by said detecting step, with the plurality of sizes of recording sheets set by said setting step, selecting a size of recording sheet on which the input data is to be recorded, from the plurality of sizes of recording sheets set by said setting step, and causing said recording step to record the input data on the selected recording sheet, wherein when no recording sheet of a size equal to or greater than the size of the input data is set, said control step compares the size of input data with sizes M times (M: an integer) as much as the plurality of sizes of recording sheets, respectively, and (1) if any of the M times sizes is equal to or greater than the size of the input data, said control step selects it as a size of recording sheet on which the input data is to be recorded, and causes said recording step to divisionally record the input data on M pieces of recording sheets having the selected size, and (2) if none of the M times sizes is equal to or greater than the size of the input data, said control step increments M by one and again executes the process specified in (1) above.

24. A method according to claim 23, wherein said recording step is performed by a facsimile apparatus.

25. A method according to claim 23, wherein said control step compares the size of the input data with sizes obtained by adding predetermined ignorable data length to the M times sizes, respectively.

26. A method according to claim 23, wherein said control step compares the sizes of the input data with sizes obtained by variably magnifying the M times sizes with an allowable magnification factor.

27. A method according to claim 23, wherein said recording step utilizes recording means that is operable to accept mounting of a plurality of cassettes for recording sheets, and said setting step sets sizes of recording sheets of the mounted cassettes to a table.

28. A method according to claim 23, wherein said input step is a receiving step.

* * * * *